(12) United States Patent
Bae

(10) Patent No.: US 7,956,571 B2
(45) Date of Patent: Jun. 7, 2011

(54) METHOD AND APPARATUS FOR MEASURING ELECTROCHEMICAL PROPERTIES

(75) Inventor: In Tae Bae, Wrentham, MA (US)

(73) Assignee: The Gillette Company, Boston, MA (US)

(*) Notice: Subject to any disclaimer, the term of this patent is extended or adjusted under 35 U.S.C. 154(b) by 680 days.

(21) Appl. No.: 12/099,426

(22) Filed: Apr. 8, 2008

(65) Prior Publication Data

US 2009/0251150 A1  Oct. 8, 2009

(51) Int. Cl.
*H01M 10/44* (2006.01)
*H01M 10/46* (2006.01)

(52) U.S. Cl. ........................................ 320/107
(58) Field of Classification Search ........... 320/107, 320/112, 132; 324/426, 427, 430, 433; 429/96, 429/122, 306
See application file for complete search history.

(56) References Cited

U.S. PATENT DOCUMENTS

| | | | |
|---|---|---|---|
| 4,888,258 A * | 12/1989 | Desjardins et al. | 429/306 |
| 5,176,968 A | 1/1993 | Blasi et al. | |
| 7,144,486 B1 | 12/2006 | Fritsch et al. | |
| 7,160,647 B2 | 1/2007 | Eylem et al. | |
| 2005/0202320 A1 | 9/2005 | Totir et al. | |
| 2006/0001430 A1 | 1/2006 | Kepler et al. | |
| 2007/0261958 A1 | 11/2007 | Jiang et al. | |

FOREIGN PATENT DOCUMENTS

| JP | 2003 149203 | 5/2003 |
|---|---|---|
| WO | WO 2006/050972 | 5/2006 |

OTHER PUBLICATIONS

Cha et al., "Recent advances in experimental methods applied to lithium battery researches", Journal of Power Sources, vol. 43-44, pp. 145-155, 1993.

V. Vivier et al., "Electrochemical Study of $Bi_2O_3$ and $Bi_2O_2CO_3$ by Means of a Cavity Microelectrode" *Journal of The Electrochemical Society*, vol. 147 (11), pp. 4252-4262 (2000).

V. Vivier et al., "A rapid evaluation of vanadium oxide and manganese oxide as battery materials with a micro-electrochemistry technique" *Journal of Power Sources*, vol. 103, pp. 61-66 (2001).

* cited by examiner

*Primary Examiner* — Edward Tso

(74) *Attorney, Agent, or Firm* — Fish & Richardson P.C.

(57) ABSTRACT

Apparatus for measuring electrochemical properties of materials, and methods of measuring electrochemical properties of materials, are provided.

32 Claims, 14 Drawing Sheets

US 7,956,571 B2

1

METHOD AND APPARATUS FOR MEASURING ELECTROCHEMICAL PROPERTIES

TECHNICAL FIELD

This invention relates to apparatus for measuring electrochemical properties of materials.

BACKGROUND

Batteries, or electrochemical cells, such as primary alkaline batteries or secondary lithium batteries, are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a separator.

When a battery is used as an electrical energy source in a device, electrical contacts are made with the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

Battery materials often are tested in a cylindrical battery form (e.g., AAA or AA battery), or in a button cell form. As an example, for a given cathode material, a button cell can include an anode (e.g., a zinc anode) and a potassium hydroxide solution, a separator paper, and a cathode containing a material of interest. During a discharge test, the anode is oxidized (e.g., to zinc hydroxide and oxide), the cathode material is reduced, and ionic transport occurs between the two electrodes and through the separator to maintain reaction stoichiometry. Usually, the cathode is mixed with a conductive aid such as graphite or carbon black to enhance discharge efficiency. Relatively large amounts of electrode active materials, numerous electrode preparation steps, and many cell components and assembly hardware are often used to make the test battery. Numerous factors can influence the data obtained from the discharge test. For example, the electrolyte resistance, material processing, amount of conductive aid (e.g., graphite), and contact resistance can all affect the accuracy of the test results.

SUMMARY

Generally, the invention relates to measuring the electrochemical properties of a very small sample of one or more materials.

In one aspect, the invention features an apparatus for measuring an electrochemical property of an electrochemically active material. The apparatus includes an electrically conducting and chemically inert substrate having a microcavity with a maximum volume of less than 15 cubic millimeter (µL), and a first electrical lead in electrical contact with the substrate.

When very small electrodes (e.g., micro-electrodes) are used in the measurements, the current used for these electrodes can be very small, and the interfering effects such as ohmic resistance and mass transport limitations, often seen in discharge tests of bulk materials, can become relatively insignificant since there can be minimal voltage loss between the small electrode surface and the external circuit. Thus, the intrinsic kinetic property of the material can be measured. Many advantages can result when the same principle is applied to a discharge test for a battery material. For example, the properties of a material of interest can be measured in a microcavity of an electrically conducting substrate (e.g., a microcavity electrode). In such a setting, a very small amount of material can be tested, conductive additives can be omitted, cell assembly tools need not be used, cathodes need not be preformed, the anode need not be in a slurry form or in a form having a high surface area, and the test cells can be discharged at higher C-rates compared to button cells or cylindrical cells. Testing materials at higher C rates can be more time-efficient, and can be advantageous for high throughput measurement of battery materials.

The microcavity electrode can be assembled as part of a small galvanic cell, which can include a small amount of an active material of interest. The galvanic cell can optionally include a conductive aid (e.g., graphite). The material of interest is packed into a microcavity at the tip of a conducting rod. A separator impregnated with an electrolyte solution and a anode, such as a zinc foil, are placed on top of the microcavity. The cell can be discharged in the same way as regular cells, but at much smaller currents. A reverse configuration in which the anode and the cathode material of interest are interchanged is also possible. The testing method simplifies conventional testing methods, but collects similar information.

In another aspect, the invention features a method including measuring an electrochemical property of a sample having a maximum volume of less than 15 cubic millimeter and including an electrochemically active material. The embodiments can include any of the features discussed above with respect to the apparatus.

Embodiments of one and/or both aspects of the invention can include one or more of the following features.

In some embodiments, the microcavity and/or the sample has a maximum volume of less than one cubic millimeter. In some embodiments, the microcavity has a maximum dimension of less than or equal to two millimeters, and/or a minimum dimension of greater than or equal to 0.01 millimeter.

In some embodiments, the electrochemically active material includes particles having a average maximum dimension. The average maximum particle dimension to maximum microcavity dimension is less than 1:5 (e.g., less than 1:10, less than 1:20, less than 1:30).

In some embodiments, the substrate includes one or more materials. The one or more materials can include platinum, titanium, tungsten, nickel, tantalum, niobium, chromium, ruthenium, zirconium, molybdenum, palladium, and/or alloys thereof, and/or stainless steel. In some embodiments, the substrate is coated with a layer of a material such as one or more noble metals. The one or more noble metal can be gold, iridium, osmium, ruthenium, palladium, platinum, silver, rhodium, and/or combinations thereof. In some embodiments, the substrate is further in communication with an electrochemical instrument or with a computer via an electrochemical instrument, such as a potentiostat and/or a galvanostat.

In some embodiments, the apparatus further includes an anode, and a second electrical lead in electrical contact with the anode. The anode and the electrical lead complete a circuit with an electrochemically active material including a cathode active material, when the cathode active material is in the microcavity. In some embodiments, when the microcavity is filled with the cathode active material, the cathode active material is in electrical contact with the first and second electrical leads, the anode, and an electrolyte.

In some embodiments, the apparatus further includes a cathode, and a second electrical lead in electrical contact with the cathode. The cathode and the second electrical lead complete a circuit with an electrochemically active material including an anode active material, when the anode active material is in the microcavity. In some embodiments, when the microcavity is filled with the anode active material, the anode active material is in electrical contact with the first and second electrical leads, the cathode, and an electrolyte.

In some embodiments, the apparatus further includes a plurality of microcavities and/or a plurality of electrochemically conducting and chemically inert substrates. At least one electrode can be in electrical contact with two or more electrical leads. In some embodiments, at least one electrical lead is in electrical contact with two or more substrates. In some embodiments, each substrate is in electrochemical contact with a first electrical lead, and the plurality of substrates is in electrochemical contact with a common counter electrode.

In some embodiments, the electrochemically active material includes a cathode active material and/or an anode active material. In some embodiments, the electrochemically active material has a mass of less than two milligrams.

In some embodiments, measuring includes contacting the sample with an apparatus including a first electrical lead and a second electrical lead. Measuring can further include forming a circuit with an anode and/or a cathode.

In some embodiments, the method can include a plurality of samples. The electrochemical property of each sample can be individually measured, either concurrently or sequentially.

Embodiments of one or both aspects of the invention also can include one or more of the following advantages.

In some embodiments, the interfering effects often seen in discharge tests of bulk materials becomes relatively insignificant since there can be minimal voltage loss between the small electrode surface and the external circuit. The intrinsic characteristics of the active material can be assessed. In some embodiments, the testing method and apparatus simplify conventional testing methods. For example, a small amount of active material can be used to characterize the active material, the conductive additives can be omitted, cell assembly tools can be omitted, the cathodes need not be preformed, the anode need not be in a slurry form or in a form having a high surface area, and/or the test cells can be discharged at higher C-rates compared to button cells or cylindrical cells.

The details of one or more embodiments of the invention are set forth in the accompanying drawings and the description below. Other features, objects, and advantages of the invention will be apparent from the description and drawings, and from the claims.

DETAILED DESCRIPTION

Battery discharge tests can be conducted to obtain the electrochemical properties of cathode and anode active materials. As the active material may be available only in small quantities, a screening method that requires a minimum amount of active material and that can accurately and efficiently measure the electrochemical properties of a material is desirable.

Figure 1:
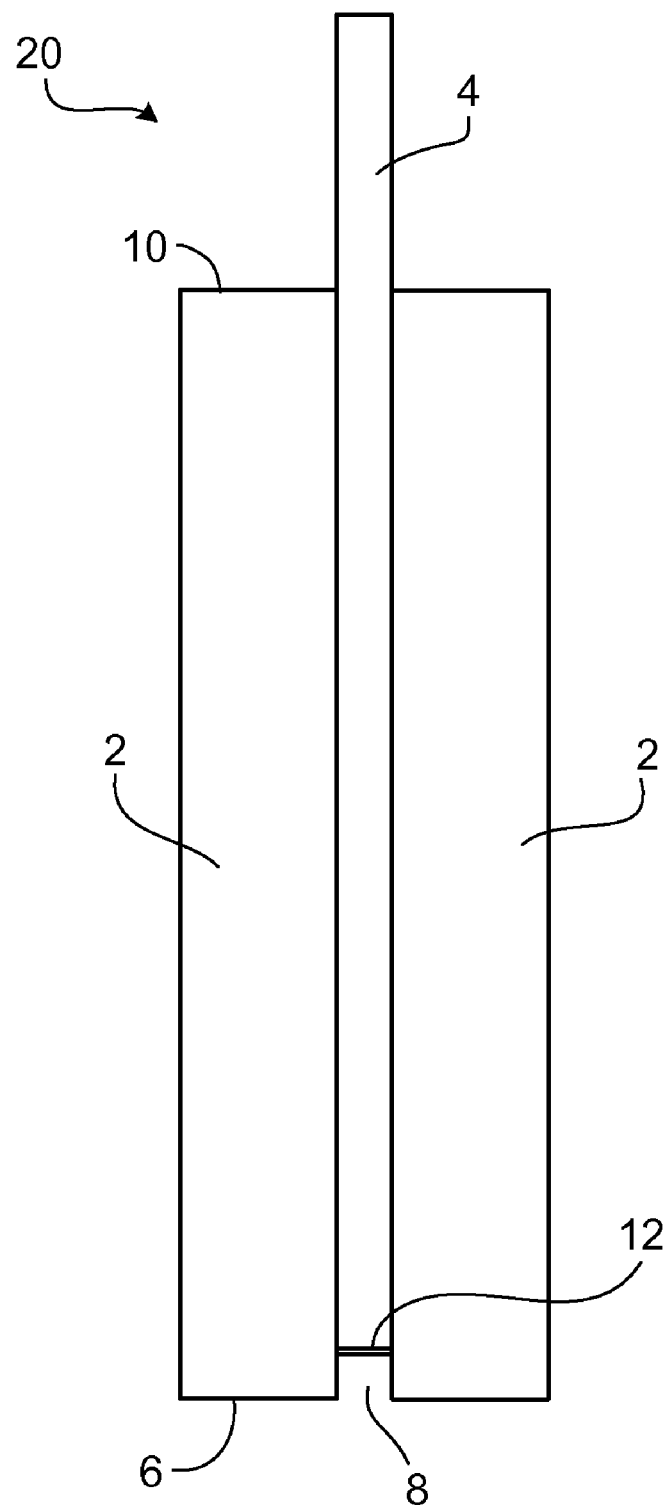
FIG. 1 is a schematic cross-sectional view of an embodiment of an apparatus.
Figure 2:
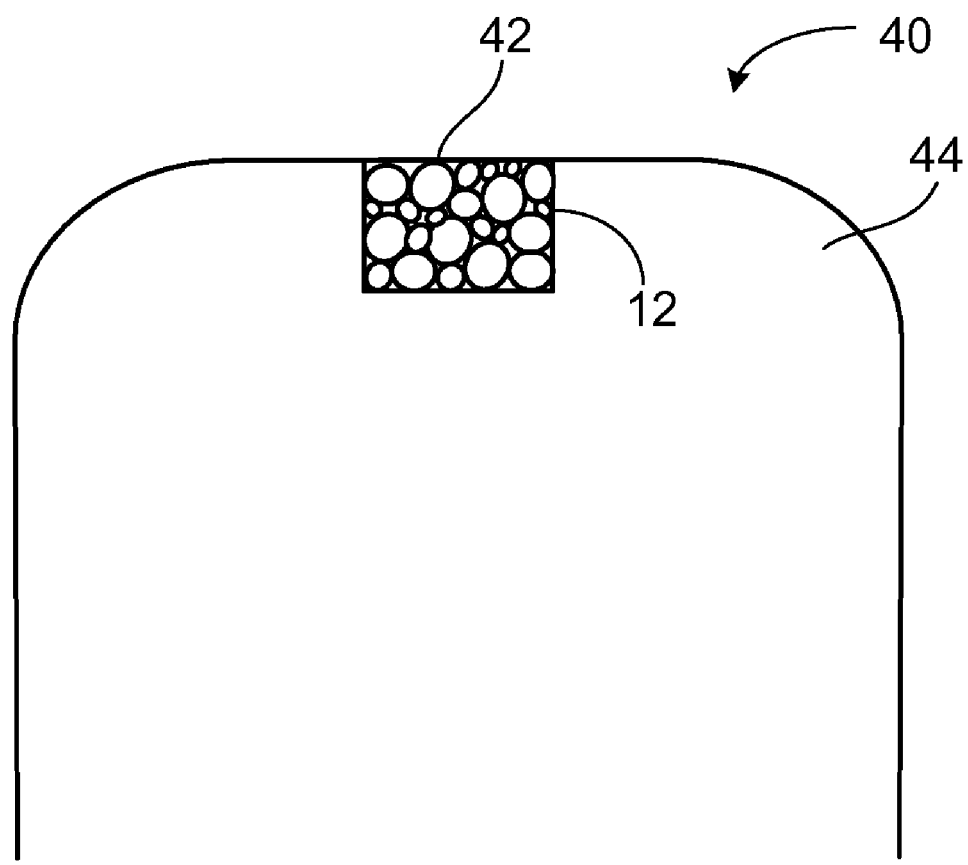
FIG. 2 is a schematic cross-sectional view of an embodiment of an apparatus.

Referring to FIG. 1, in some embodiments, a microcavity electrode 20 includes an insulating sheath 2 surrounding a conducting core 4. At one end 6 of the electrode, the insulating sheath extends beyond the conducting core to form a microcavity 8. At a second end 10 of the electrode, the conducting core protrudes from the insulating sheath. In some embodiments, referring to FIG. 2, a microcavity electrode 40 includes a microcavity 42 directly located within an electrically conducting substrate 44, without an insulating sheath. In some embodiments, one or more surfaces of the microcavity electrode and/or of the microcavity itself is optionally coated with an electrically conducting but chemically inert material 12. Material 12 can be in the form of a layer.

The microcavity can have any shape, for example, a cylindrical, prismatic, hemispherical, or irregular shape. In some embodiments, the microcavity can have a maximum dimension of less than or equal to two millimeters (e.g., less than or equal to one millimeter, less than or equal to 0.75 millimeter, or less than or equal to 0.5 millimeter) and/or more than or equal to 10 micrometers (e.g., more than or equal to 0.5 millimeter, more than or equal to 0.75 millimeter, or more than or equal to one millimeter). The maximum dimension of a microcavity can be measured using a microscope (e.g., a Keyence VHX-100 microscope), from a microscope image. The microcavity can have a volume of less than 15 µL (or 15 mm$^3$) (e.g., less than 13 µL, less than 5 µL, less than 1 µL, or less than 0.01 µL) and or more than 0.001 µL (e.g., more than 0.01 µL, more than 1 µL, more than 5 µL, more than 13 µL). In some embodiments, the microcavity can have a maximum volume of less than or equal to two cubic millimeters (e.g., less than one cubic millimeter, less than 0.75 cubic millimeter, or less than 0.5 cubic millimeter) and/or more than 0.1 cubic millimeter (e.g., more than 0.5 cubic millimeter, more than 0.75 cubic millimeter, more than one cubic millimeter).

In some embodiments, the microcavity is cylindrical and has a diameter to depth ratio of greater than or equal to 0.5 (e.g., greater than or equal to 1.0, greater than or equal to 1.5, greater than or equal to 2.0, or greater than or equal to 2.5) and/or less than or equal to 3 (e.g., less than or equal to 2.5, less than or equal to 2.0, less than or equal to 1.5, or less than or equal to 1.0). The diameter can be larger or equal to 10 µm and/or less than or equal to 2 mm.

The insulating sheath can be formed of any insulating material that can be precisely cut and that does not deform and/or decompose under testing conditions (e.g., from −20° C. to 80° C. and/or in contact with a solvent). For example, the sheath can be formed of an inactive material such as glass, stainless steel, inactive ceramic materials, inactive polymers, or passivating metals (e.g., W, Ti, Zr, Nb, and/or Ta). In some embodiments, the sheath is formed of a reactive material, but is coated with an insulating coating of the inactive material.

Referring again to FIG. 1, the insulating sheath can coat a continuous surface of the microcavity, for example, the peripheral walls of the micro cavity.

In some embodiments, the conducting core can define one surface of the microcavity, for example, the bottom surface. The conducting core can be a metal wire, such as a platinum wire. In some embodiments, the conducting core can include a material such as stainless steel, platinum, titanium, tungsten, nickel, tantalum, niobium, chromium, ruthenium, zirconium, molybdenum, and/or palladium; or alloys including platinum, titanium, tungsten, nickel, tantalum, niobium, chromium, ruthenium, zirconium, molybdenum, and/or palladium.

In some embodiments, when the microcavity is directly located within the electrically conducting substrate, the electrically conducting substrate can include a material such as stainless steel, platinum, titanium, tungsten, nickel, tantalum, niobium, chromium, ruthenium, zirconium, molybdenum, and/or palladium; or alloys including platinum, titanium, tungsten, nickel, tantalum, niobium, chromium, ruthenium, zirconium, molybdenum, and/or palladium.

In some embodiments, one or more surfaces of the microcavity electrodes can be coated with an electrically conducting material (e.g., 12) that is relatively inert (e.g., chemically inert) to testing conditions that the microcavity electrode is subjected to. For example, the one or more surface can be coated with one or more noble metals, such as gold, iridium, osmium, ruthenium, palladium, platinum, rhodium, and/or silver. The coating can have any thickness. For example, the coating can be a layer having a thickness of less than or equal to 100 microns (e.g., less than or equal to 80 microns, less than or equal to 60 microns, less than or equal to 30 microns, or less than or equal to one micron) and/or more than or equal to 0.01 microns (e.g., more than or equal to one microns, more than or equal to 30 microns, more than or equal to 60 microns, or more than or equal to 80 microns).

Figure 3:
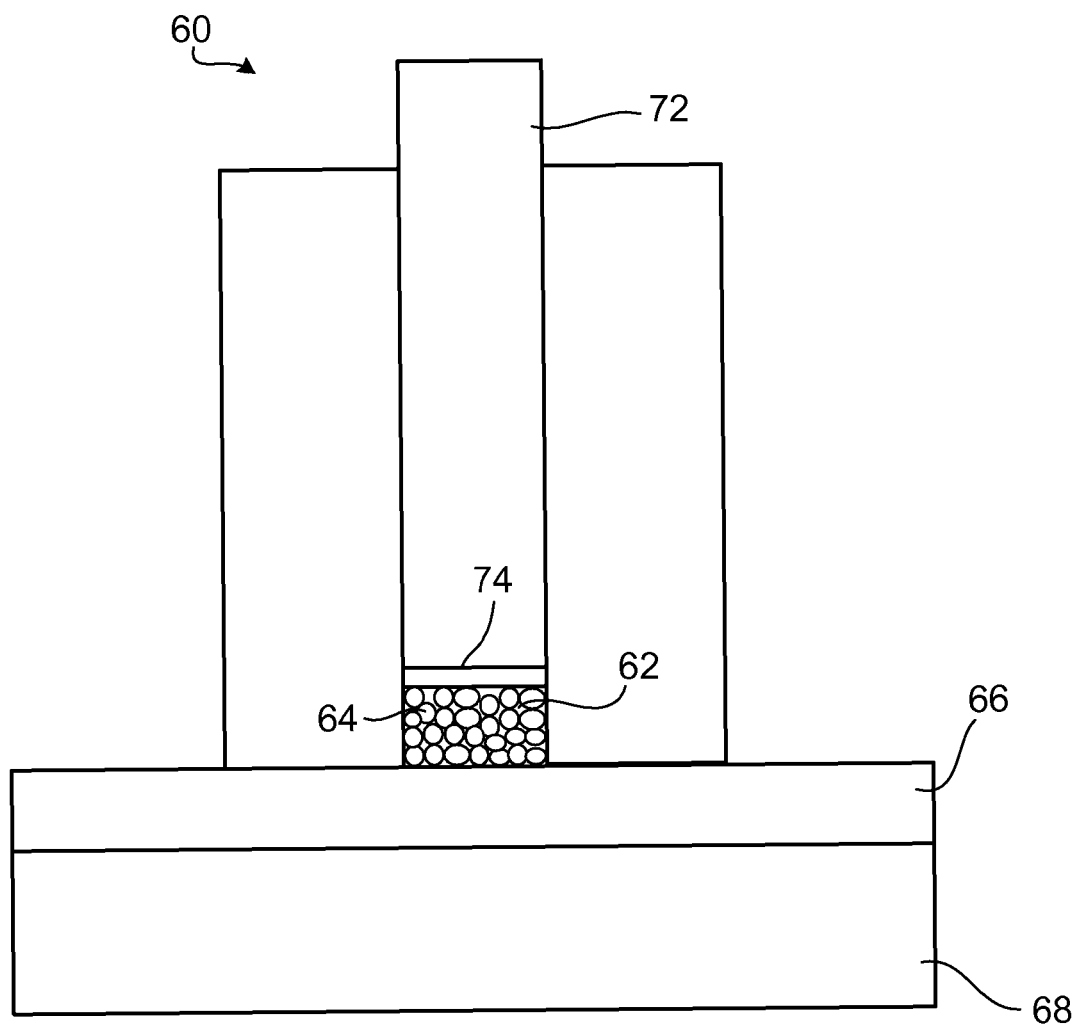
FIG. 3 is a schematic cross-sectional view of an embodiment of a battery.

In use, the microcavity electrode can be assembled into a testing device, such as a battery. Referring to FIG. 3, a device 60 includes a microcavity 62 formed by insulating sheath 70 and conducting core 72. The microcavity is coated with an electrically conducting and chemically inert layer 74. A battery active material 64 is packed into microcavity 62. A separator 66 impregnated with electrolyte is located between the microcavity electrode and a counter electrode 68. To fill a microcavity electrode with the battery active material, the microcavity electrode can be pressed down several times on an active material powder, which can be finely ground and have an average maximum size of less than ⅕ (e.g., less than 1/10, less than 1/20, or less than 1/30) of the maximum dimension of the microcavity. In some embodiments, the battery active material can be in the form of a paste, or a gel, or any active material that is stable under testing conditions. In some embodiments, when the battery active material is a cathode active material, the counter electrode can be a zinc foil. In some embodiments, the counter electrode need not have a high area because the microcavity electrode has a small reaction zone. Further, the small amount of the battery active material within the microcavity can be sufficiently accommodated by a multi-dimensional mass transport of one or more reactants in the electrolyte phase and the fast kinetics of the counter electrode (e.g., zinc). The circuit can be completed when electrical contact is established between the microcavity electrode and the counter electrode.

Figure 4:
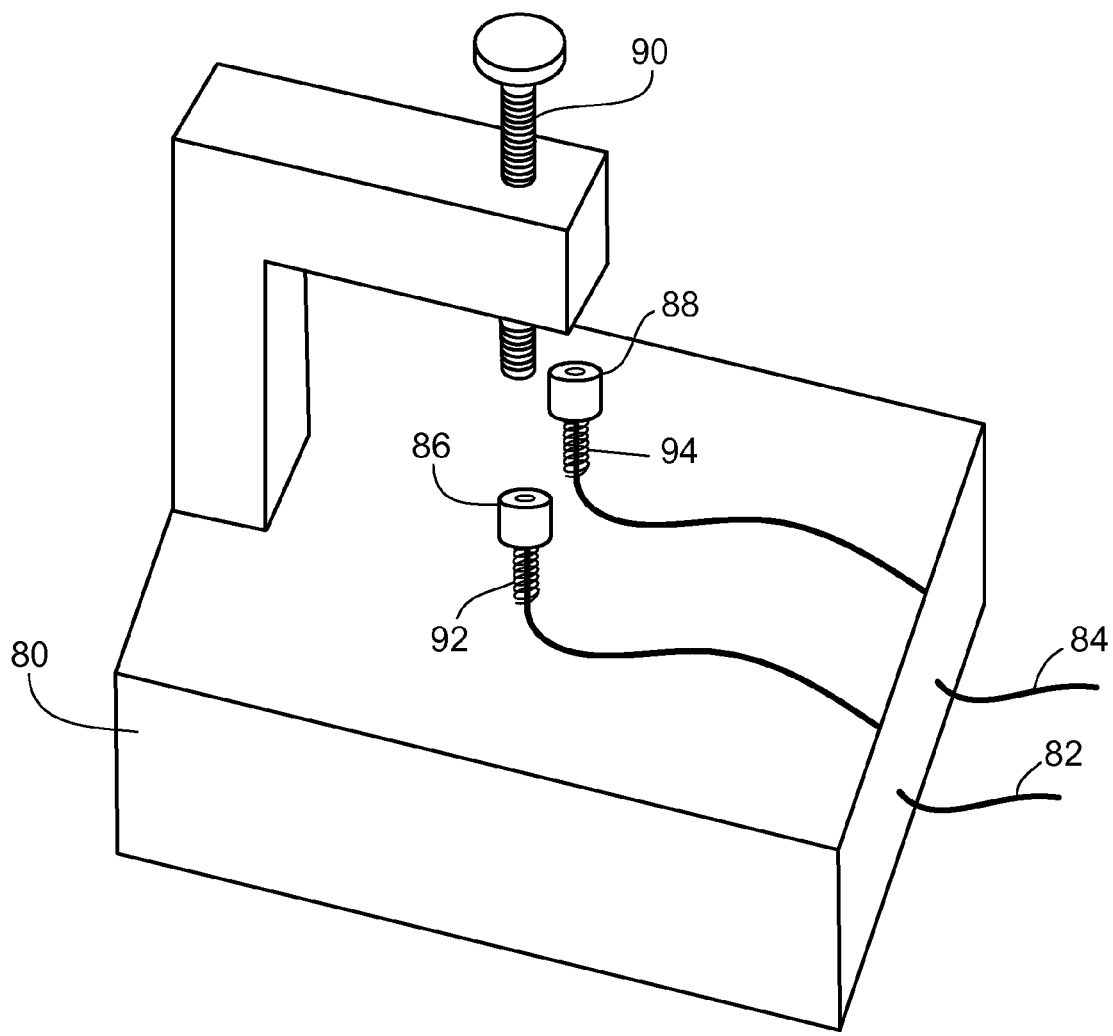
FIG. 4 is a perspective view of an embodiment of a device.

In some embodiments, referring to FIG. 4, the microcavity electrode is disposed in an inert holder 80, which has two electrical leads (wires 82 and 84), each electrically connected to either the microcavity electrode 86 or a contact 88 for the counter electrode. In some embodiments, the holder for the microelectrodes is made of any material that is relatively chemically inert and non-conductive, such as acrylic and/or non-conductive plastic materials (e.g., teflon, polypropylene). The holder can include a screw 90 which can ensure contact between the contents of the microcavity electrode and the counter electrode. The holder can further include electrically conducting springs 92 and 94 beneath the microcavity electrode and the contact for the counter electrode, to adjust for any height differences between microcavity electrode 86 and contact 88, thereby ensuring electrical communication between the electrodes. When the microcavity electrode containing a battery active material is in the holder, a separator impregnated with an electrolytic solution can be contacted to the microcavity electrode, and a counter electrode can be superimposed onto the separator. Finally, the device can be connected with an instrument such as a potentiostat or a galvanostat through wires 82 and 84, such that an electric current can flow through the device. In some embodiments, the electrical leads are connected to a connector that serves as an interface to an electrochemical instrument. For example, the connector can be any multi-pin connector (e.g., a DB-9 connector).

Figure 5:
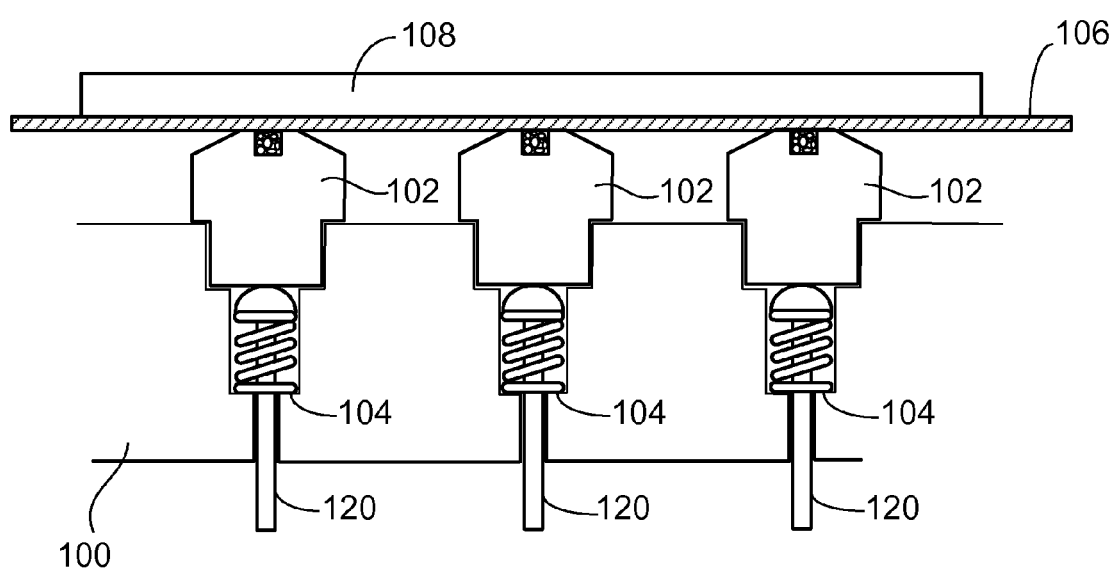
FIG. 5 is a schematic cross-sectional view of an embodiment of a battery.
Figure 6A:
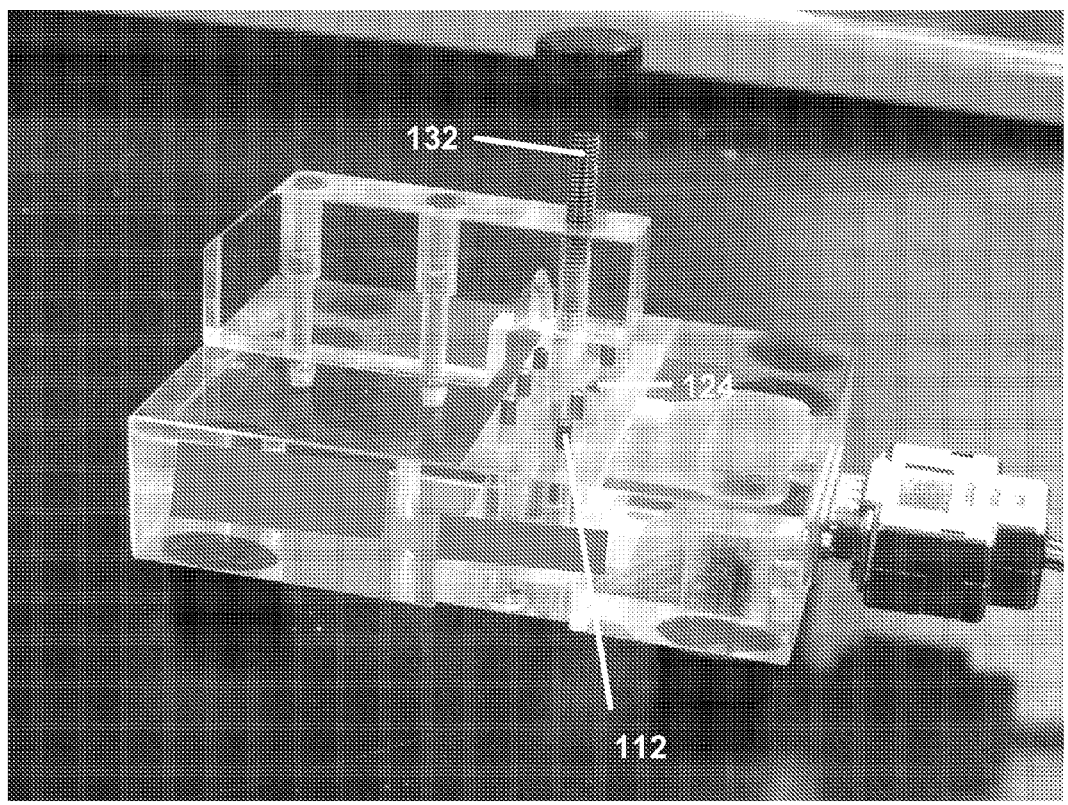
FIGS. 6A-6C are photographs of an embodiment of an apparatus in an array.
Figure 6B:
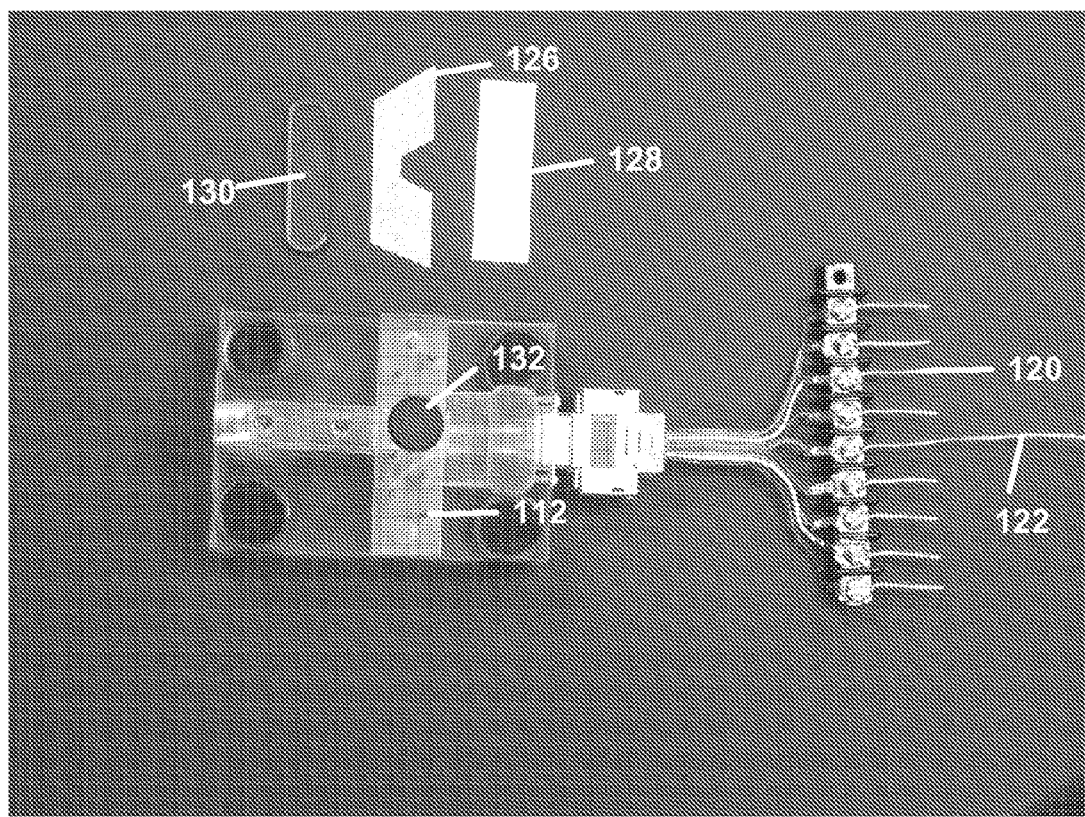
Figure 6C:
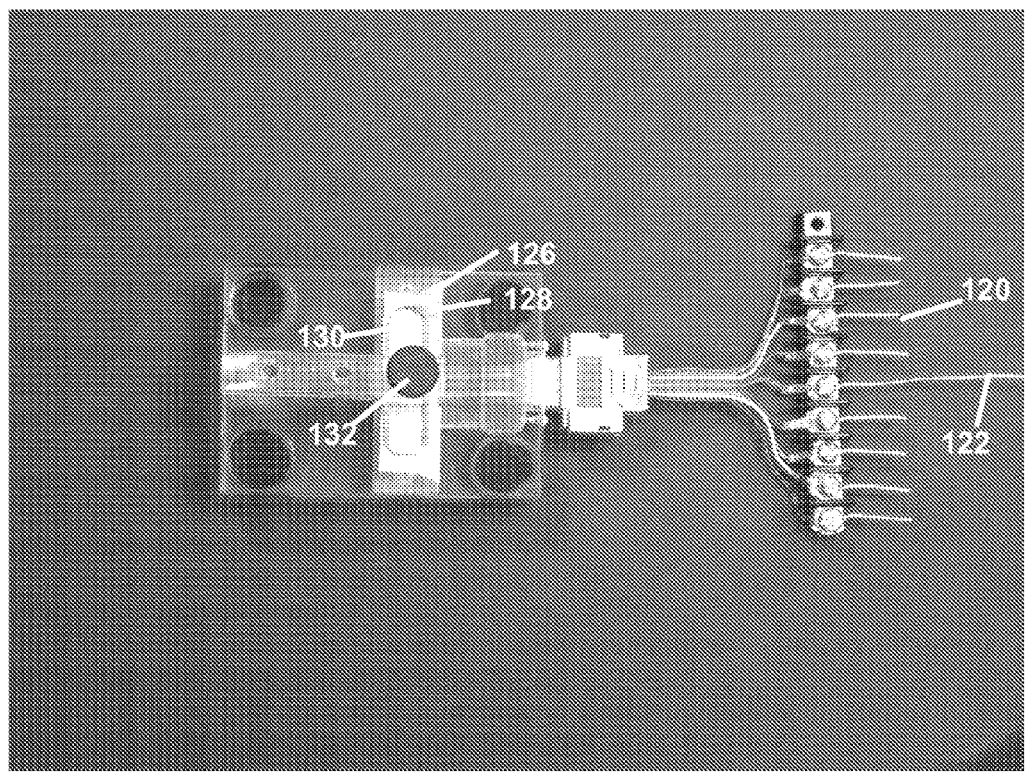

In some embodiments, referring to FIG. 5, two or more microcavity electrodes are assembled into an array device. For example, two or more microcavity electrodes 102 can be inserted into an inert holder 100. Each microcavity electrode can have a spring 104 beneath the electrode to adjust for any height differences between the electrodes. The electrodes can share a common separator 106 that is impregnated with an electrolyte and a common counter electrode 108. As shown in FIGS. 6A and 6B, each microcavity electrode 112 can be in electrical communication with a corresponding electrical lead (wire 120), and the common counter electrode can be in electrical communication with a single electrical contact 124, which is in turn contacted with an electrical lead (wire 122). Referring to FIGS. 6B and 6C, wires 120 and 122 protrude from the device and can be connected to a potentiostat or a galvanostat, such that voltage and current can be measured when a battery active material is contained in the microcavity electrode. A separator 126 separating the microcavity electrode and a counter electrode 128, a counter electrode 128, and optionally an inert plate 130 ensuring uniform contact that applies uniform pressure onto the counter electrode 128 and the microcavity electrodes, are layered onto the microcavity electrode and screwed down with screw 132 to complete a circuit.

In some embodiments, when the microcavity electrodes are in an array, the electrodes are arranged such that there is minimal cross-interference between the electrodes. In some embodiments, the minimum distance between two adjacent microcavities is greater than the minimum distance between each microcavity and the counter electrode. In some embodiments, the distance between the electrodes can be greater than or equal to one centimeter (e.g., greater than or equal to 1.5 cm, or greater than or equal to 2 cm) and/or less than or equal to 3 cm (e.g., less than or equal to 2 cm, or less than or equal to 1.5 cm).

In some embodiments, the spring is made of a material that is electrically conducting and relatively chemically inert. For example, the spring can include any of a variety of shapes, such as a coil or a cantilever. The spring can include a copper-beryllium alloy, nickel, tin, bronze, brass, zinc, and/or silver, and can be optionally plated with a conductive material (e.g., gold). The spring can adjust for differences in the height of the microcavity electrodes and the counter electrode contact, such that these components can be in electrical contact with the separator and the counter electrode. In some embodiments, the spring itself is part of the electrical connection.

While electrical leads such as wires have been described in the foregoing, in certain embodiments, the electrical leads can be in any form (e.g., a tab, a wire) which can be directly or indirectly in contact with a microcavity electrode. The electrical leads are conductive, and can include a material such as copper, silver, gold, aluminum, and/or alloys thereof. In some embodiments, the electrical lead is soldered onto the spring, which is then electrically contacted to a microcavity electrode or a counter electrode, either directly or indirectly.

In some embodiments, the microcavity electrode is removable from the holder and has a mass that can be easily measured using a balance (e.g., a precision microbalance). Thus, the mass of the microcavity electrode can be measured before and after the inclusion of a battery active material, and the mass of the battery active material can be determined from the difference between the mass measurements. In some embodiments, the ratio of the mass of the active material and that of the microcavity electrode can range from 1:100 to 1:10,000 (e.g., from 1:100 to 1:1,000, from 1:100 to 1:5,000; from 1:500 to 1:10,000, from 1:1,000 to 1:10,000).

The amount of active material can be proportional to the size of the microcavity, such that a smaller microcavity can hold a smaller amount of active material, and a larger microcavity can hold a larger amount of active material. The volume of the active material in a microcavity electrode can be less than 15 µL (e.g., less than 13 µL, less than five µL, less than one µL, or less than 0.01 µL) and or more than 0.001 µL (e.g., more than 0.01 µL, more than one µL, more than five µL, or more than 13 µL). In some embodiments, the volume of the active material in a microcavity electrode can be less than or equal to two cubic millimeters (e.g., less than one cubic millimeter, less than 0.75 cubic millimeter, or less than 0.5 cubic millimeter) and/or more than 0.1 cubic millimeter (e.g., more than 0.5 cubic millimeter, more than 0.75 cubic millimeter, more than one cubic millimeter). In some embodiments, less than or equal to 120 mg (e.g., less than or equal to 50 mg, less than or equal to 10 mg, less than or equal to five mg, less than or equal to two mg, or less than or equal to 0.8 µL) and/or greater than or equal to 0.5 µg (e.g., greater than or equal to 0.8 µg, greater than or equal to two mg, greater than or equal to five mg, greater than or equal to 10 mg, or greater than or equal to 50 mg) of active material is used for testing. The mass of the battery active material can be determined from the difference between the mass measurements of the microcavity electrode before and after packing with the battery active material, or by measuring the mass of the active material that is recovered from a packed microcavity electrode. The small amount of required active material can be advantageous, for example, in material screening where a small amount of material may be synthesized or available for testing.

In some embodiments, the electrolyte can be a liquid. The electrolyte can include a variety of solvents and/or salts. Examples of electrolyte compositions are described, for example, in Totir et al., U.S. Patent Application Publication No. 2005-0202320 A1 and Eylem et al, U.S. Pat. No. 7,160, 647.

In some embodiments, the separator is a sheet of paper or any standard separator materials used in electrochemical and galvanic cells. For example, separator 20 can be formed of polypropylene (e.g., nonwoven polypropylene, microporous polypropylene), polyethylene, and/or a polysulfone. Separators are described, for example, in Blasi et al., U.S. Pat. No. 5,176,968. The separator may also be, for example, a porous insulating polymer composite layer (e.g., polystyrene rubber and finely divided silica).

In some embodiments, the counter electrode is an anode active material, such as a zinc foil. In some embodiments, the counter electrode includes one or more alkali metals (e.g., lithium, sodium, potassium) as the anode active material. The alkali metal may be the pure metal or an alloy of the metal. In some embodiments, the counter electrode can include a cathode active material, and the active material in the microcavity can be an anode active material.

In some embodiments, the current used for the test battery measurements is relatively small. As an example, the current can be less than or equal to 20 C. and/or more than or equal to 0.1 C.

The microcavity electrode can be made in a variety of ways. As an example, the microcavity electrode can be made by etching a conducting core embedded within an inert matrix. For example, a conducting core such a platinum wire can be inserted into a glass tube. One end of the glass tube can be sealed using a propane torch, the sealed end can be polished using sand paper and/or an alumina slurry, and the platinum can be etched in a corrosive bath (e.g., an aqua regia bath). The amount of etched material can be monitored using a microscope.

In some embodiments, the microcavity is drilled into a substrate by mechanical drilling (e.g., using a carbide drill bit), laser drilling, chemical etching, and lithographic methods.

In some embodiments, measurements using an array of microcavity is amenable to automation. For example, sampling, measurement, disposal, and/or recuperation of an active material can be done using a robot. The array can be connected to an electrochemical measurement equipment or a battery tester, and controlled by a computer.

The following examples are meant to be illustrative and not to be limiting.

Example 1

A platinum wire having a desired diameter corresponding to a cavity diameter (100 microns) was inserted into a glass tube (114" outer and 1/16" inner diameter) and one end was sealed using a propane torch. The sealed end was polished on a 2000 grit sand paper and the platinum was etched in a heated aqua regia bath to about 100 micron in depth. The etched depth was monitored by frequent removal of the electrode from the etching bath and inspecting the electrode under a microscope. The exposed platinum surface was plated with gold to provide a better electrical contact and to pacify the active surface of platinum.

Figure 7:
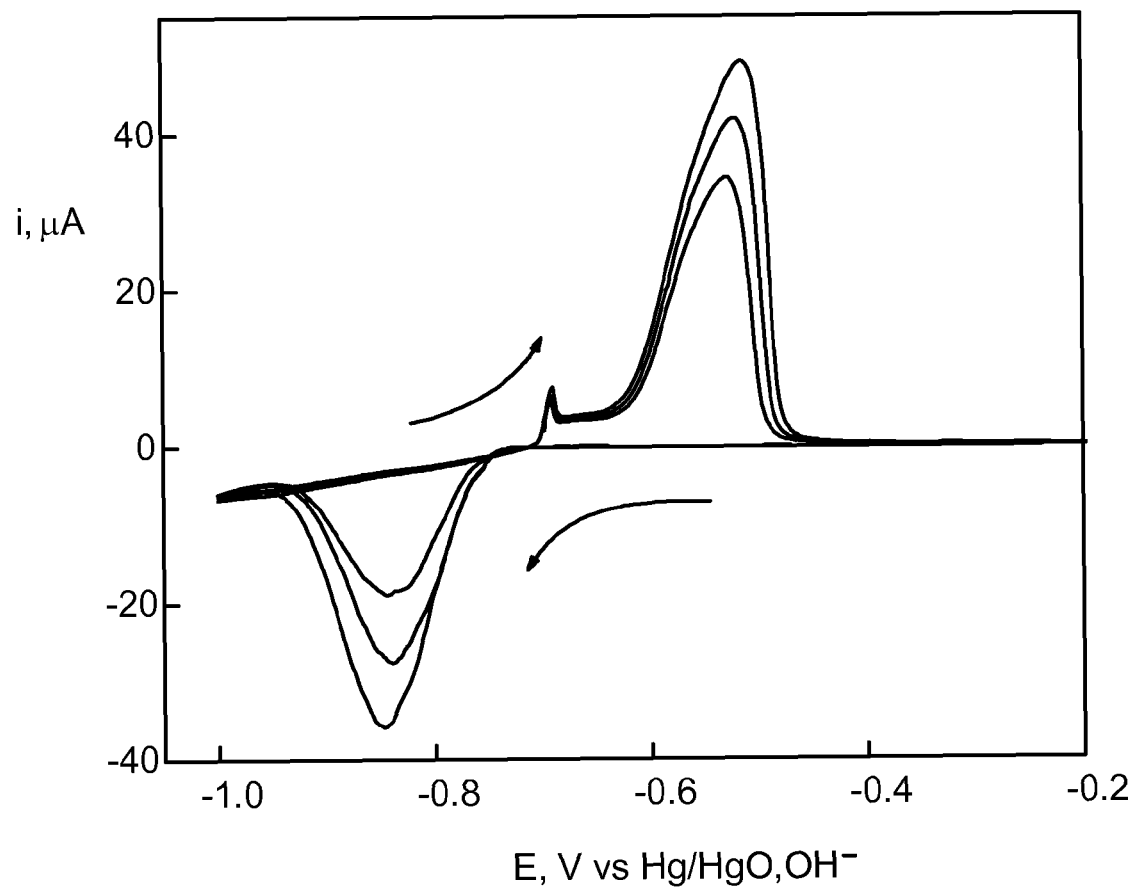
FIG. 7 is a voltammetric graph of an embodiment of a battery.

The microcavity was filled by hand, by pressing the cavity tip onto an active material powder several times, followed by wiping the tip with filter paper to remove excess materials from the surface of the glass tip. The electrode was transferred to a Teflon electrochemical cell equipped with a Luggin capillary for the reference electrode. In order to examine the accuracy of the electrode, a $Bi_2O_3$ material analogous to literature materials (V. Vivier et al., *J. Electrochem. Soc.* 147, 4252 (2000)) was tested in the microcavity electrode. The resulting voltammetric curves plotted in FIG. 7 were consistent with those in the literature, and reflected three consecutive scans, indicating gradual wetting of the test material.

The microcavity electrode was quickly cleaned for fresh sampling by sonication followed by sequential rinsing with acid and water.

Figure 8:
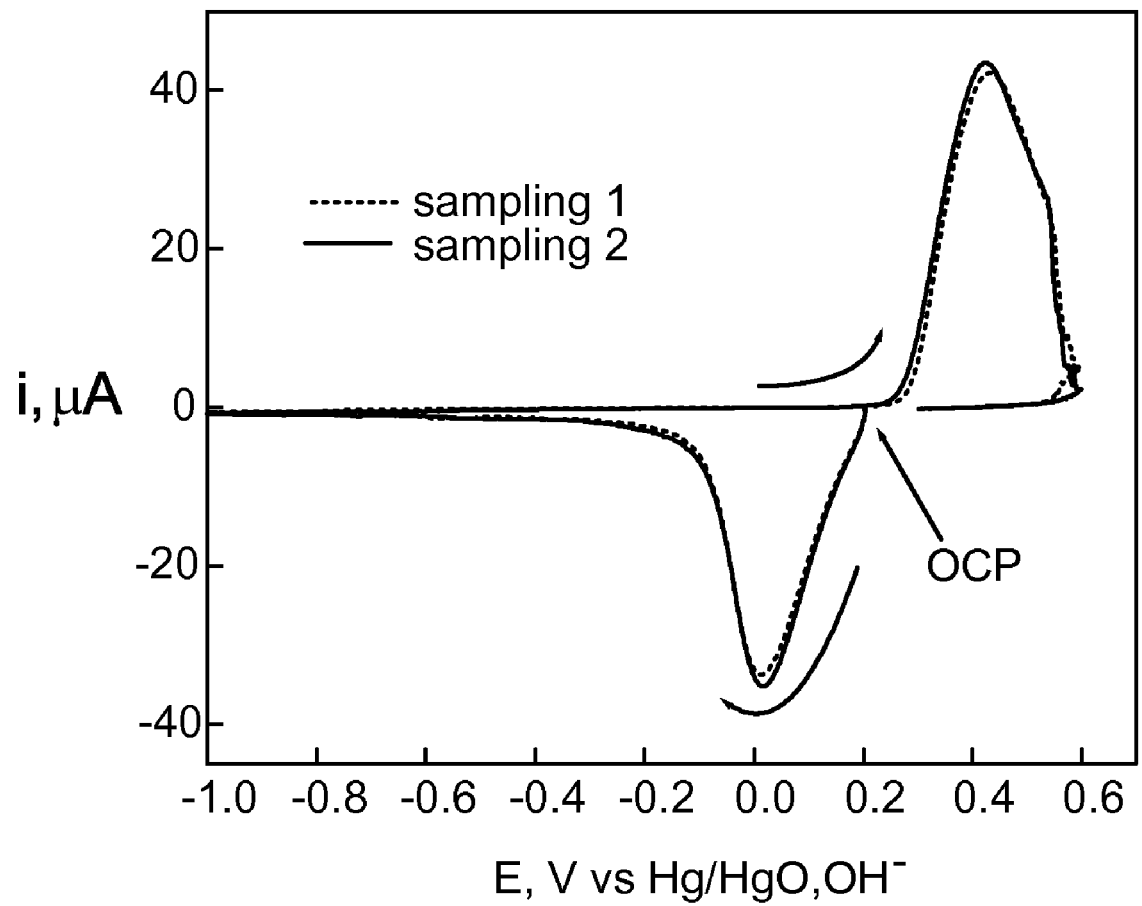
FIG. 8 is a voltammetric graph of an embodiment of a battery.

Tests of the technique were extended to commercial NiOOH materials. Two samples of CoOOH-coated nickel oxyhydroxide were evaluated using the microcavity electrode to examine reproducibility for quantitative comparison. FIG. 8 shows the first cathodic scans of two samplings in 40% KOH, clearly indicating a good reproducibility of repeated sampling.

Figure 9:
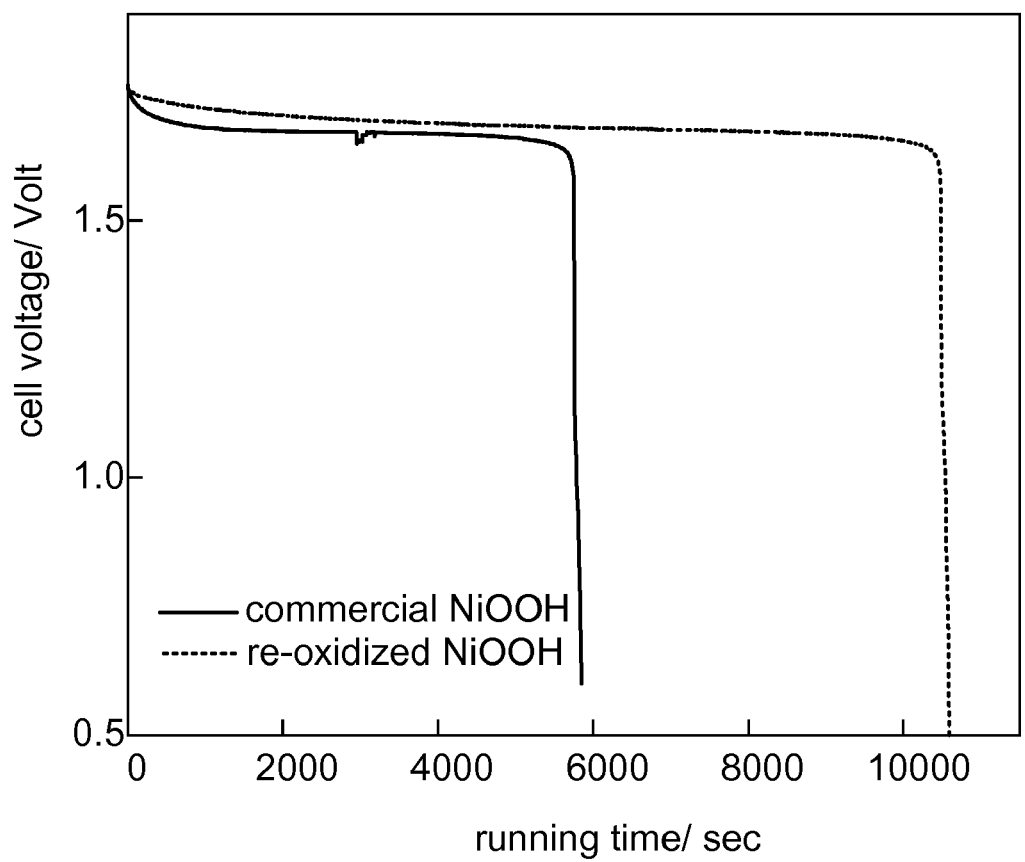
FIG. 9 is a discharge graph of an embodiment of a battery.

An open electrochemical cell configuration was used for the tests to decrease the likelihood of material dislodging due to possible material wetting, expansion, and/or shrinkage as electrochemical reaction takes place. Thus, confining the cathode material within the cavity by directly placing a separator and an anode onto the microcavity electrode, i.e., forming a micro-battery (FIG. 3) can significantly reduce the likelihood of such potential problems. The separator, a filter paper disk having 0.25 inch diameter and 50 μm thickness, was soaked with a 35% $KOH_{(aq)}$ electrolyte. The anode was a zinc foil. FIG. 9 shows examples of the micro-battery configuration described in FIG. 3 with test results for commercial NiOOH before and after reoxidation by sodium persulfate, with application of a constant current.

Example 2

A microcavity having a diameter of 0.76 mm and a depth of 0.90 mm was drilled in the tip of a 0.25 inch diameter stainless steel rod (18-8PH). The measured resistance was less than 0.01 Ohm. The samples packed within the cavity was recuperated and weighed for quantification. The weight of the sample was determined by averaging five independent weight measurements. Micro-batteries can be constructed in an analogous manner as in FIG. 3.

Test results for commercial battery materials with a paper separator containing 40% KOH at 0.1 mA (0.4 C rate) and 0.5 mA (2 C rate) were as in FIG. 10A-FIG. 10D.

Figure 10A:
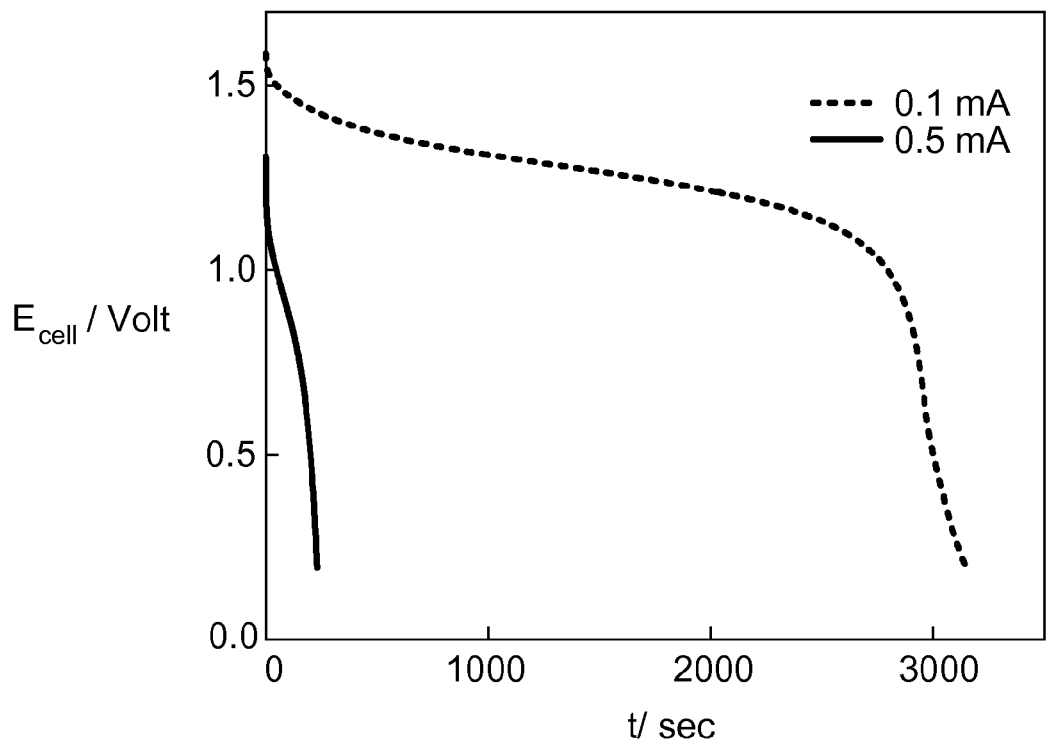
FIG. 10A-10D are discharge graphs of embodiments of a battery.
Figure 10B:
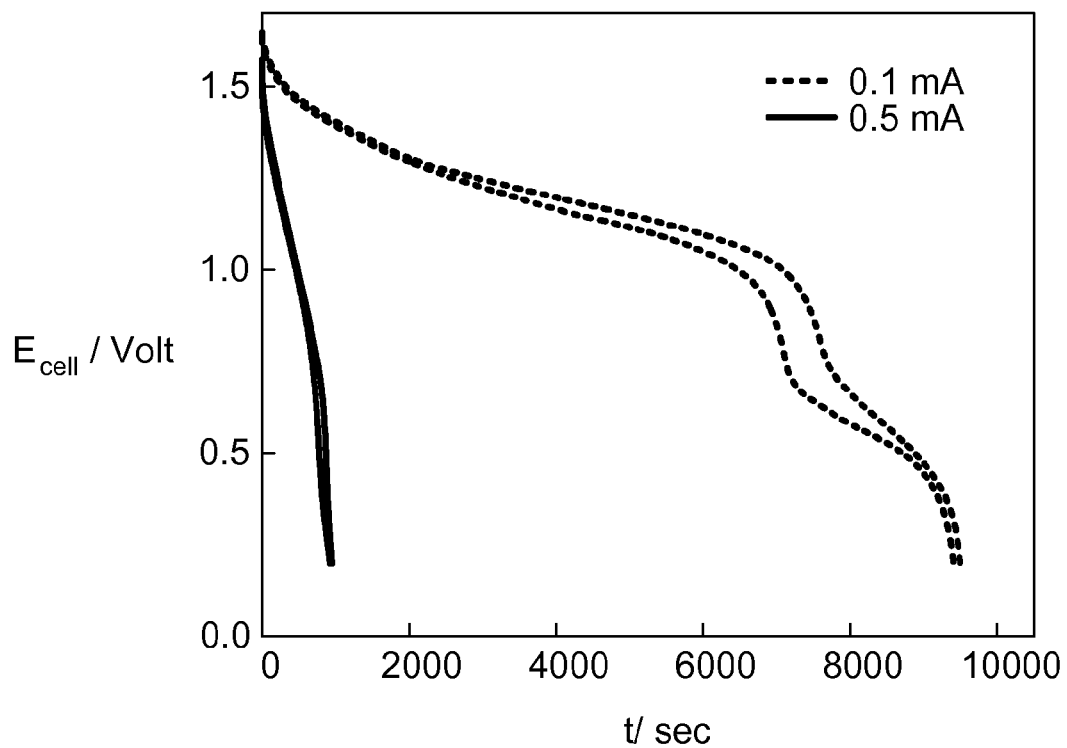
Figure 10C:
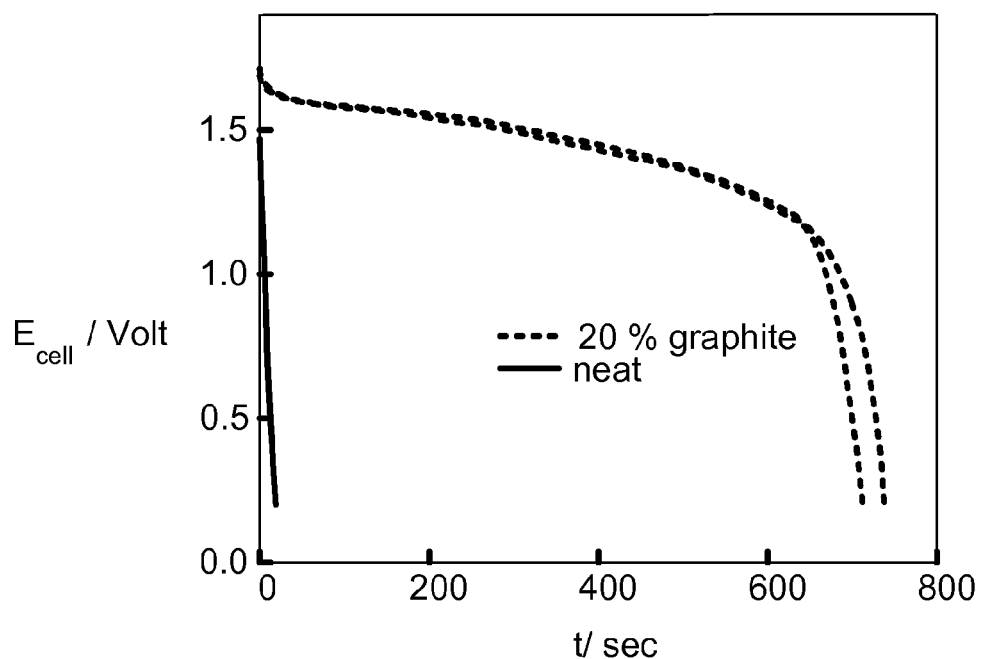
Figure 10D:
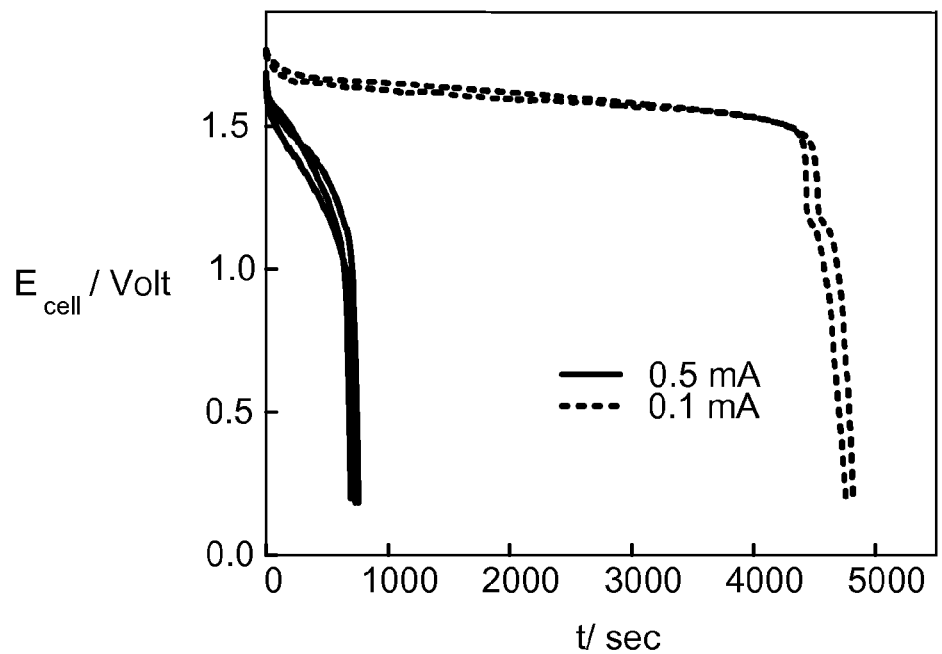

The amount of materials packed in the cavity was measured by weighing 5 samples and taking an average for $MnO_2$ including 5% graphite (net $MnO_2$ is 88% by weight). The mass of the active material was 0.85 mg (FIG. 10B). At 0.4 C rate, the material utilization was greater than 95%, and results were reproducible. These results indicate that materials can be tested without conductivity-enhancing additives such as graphite although material utilization is much lower compared to those with graphite.

These micro-batteries based on cavity design are particularly suited for testing battery cathode materials available in small quantities and the data collected therein are compatible with those from typical batteries of regular form factors.

Example 3

Based on the design description in Examples 1 and 2, an assembly of 8-cell microcavity battery array was constructed. Eight microcavity electrodes were made by drilling a cavity (0.8 mm diameter) onto one end of a stainless steel rod (3/32" diameter, 3/8" long) to hold about 1 mg of solid powder samples and the cavity was plated with gold. 8 cells were assembled in an acrylic body with spring-loaded electrical contacts that were connected to an external multi-channel battery testing instrument through a DB-9 connector. The assembly was designed to use a single common anode and a single common separator. The cell-to-cell separation was about 1.5 cm to reduce the cross-interference to less than 1% of any type of measurements based on the resistance values of separator thickness and minimum cell-to-cell distance. Cell preparation was made by tamping the cavities onto a small pile of powder specimen, placing electrolyte-soaked separator and the common anode foil on the microcavity electrodes, and thumb-screwing a single screw on the acrylic holder to press all 8 cells via a stainless steel plate (1/8" thick). The assembly is shown in FIGS. 6A-6C.

Nickel oxyhydroxide was formed by grinding with 20% by weight graphite powder and packed into the microcavities. The weight of each cavity material (0.9-1.1 mg) was obtained by weighing the microcavity electrode before and after packing with the active material specimen using a precision balance. The paper separator was soaked with 35% potassium hydroxide and the anode was a section of zinc foil (2×8 cm, 0.12 mm thick). All 8 cells were simultaneously discharged at 0.1 mA (about 0.1 A/g rate) using 8-channel battery tester.

Figure 11:
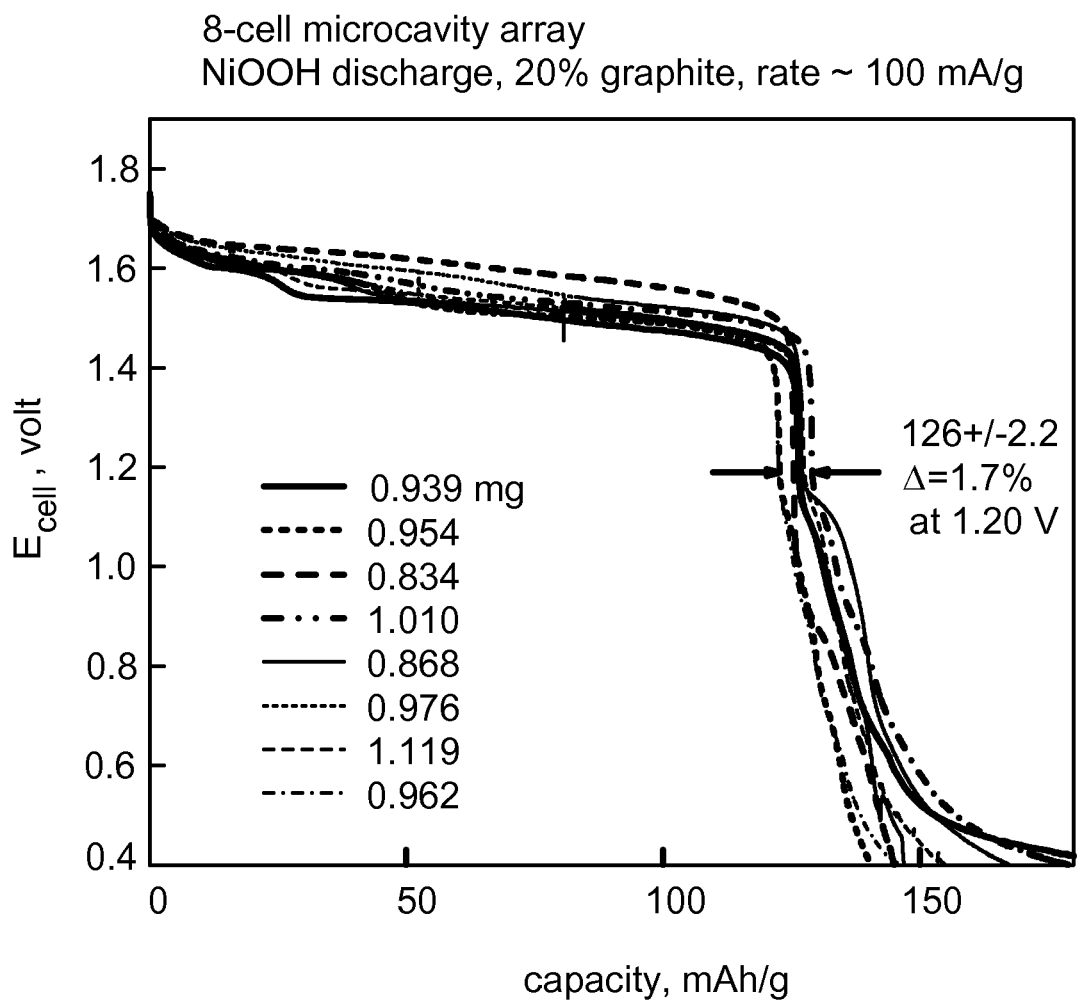
FIG. 11 is a discharge graph of an embodiment of a battery.

Referring to FIG. 11, all 8 cells showed a typical nickel oxyhydoxide discharge pattern. The runtime distribution revealed a standard deviation of less than 2% in mAh/g, indicating that this microcavity technique was suitable for high throughput battery material testing at rapid rates in small quantities.

A number of embodiments of the invention have been described. Nevertheless, it will be understood that various modifications may be made without departing from the spirit and scope of the invention. For example, the microcavity electrode can be operated in a device under inert atmosphere for air-sensitive materials and/or moisture sensitive materials. In some embodiments, the microcavity electrode is operated in a environmentally-controlled box, such as those commonly used in lithium electrochemistry. Accordingly, other embodiments are within the scope of the following claims.

What is claimed is:

1. An apparatus for measuring an electrochemical property of an electrochemically active material, comprising:
    an electronically conducting and chemically inert substrate having a microcavity with a maximum volume of less than 15 cubic millimeters, and
    a first electrical lead in electrical contact with the substrate.

2. The apparatus of claim 1, wherein the microcavity has a maximum volume of less than one cubic millimeter.

3. The apparatus of claim 1, wherein the microcavity has a maximum dimension of less than or equal to two millimeter.

4. The apparatus of claim 1, wherein the microcavity has a minimum dimension of greater than or equal to 0.01 millimeter.

5. The apparatus of claim 1, wherein the substrate comprises one or more materials selected from the group consisting of platinum, titanium, tungsten, nickel, tantalum, niobium, chromium, ruthenium, zirconium, molybdenum, palladium, alloys thereof, and stainless steel.

6. The apparatus of claim 1, wherein the substrate comprises stainless steel.

7. The apparatus of claim 1 wherein the substrate is further coated with a layer of a material.

8. The apparatus of claim 7, wherein the material is a noble metal.

9. The apparatus of claim 8, wherein the noble metal is selected from the group consisting of Au, Ir, Os, Ru, Pd, Pt, Ag, Rh, and combinations thereof.

10. The apparatus of claim 1, further comprising an anode and a second electrical lead in contact with the anode that complete a circuit with an electrochemically active material comprising a cathode active material, when a cathode active material is in the micro cavity.

11. The apparatus of claim 10, wherein when the microcavity is filled with the cathode active material, the cathode active material is in electrical contact with the first and second electrical leads, the anode, and an electrolyte.

12. The apparatus of claim 1, further comprising a cathode and a second electrical lead in contact with the cathode that completes a circuit with an electrochemically active material comprising an anode active material, when an anode active material is in the micro cavity.

13. The apparatus of claim 12, wherein when the microcavity is filled with the anode active material, the anode active material is in electrical contact with the first and second electrical leads, the cathode, and an electrolyte.

14. The apparatus of claim 1, wherein the electrochemically active material has a mass of less than two milligrams.

15. The apparatus of claim 3, wherein the electrochemically active material includes particles having an average maximum dimension, and the average particle maximum dimension to maximum microcavity dimension ratio is less than or equal to 1:5.

16. The apparatus of claim 1, wherein the substrate is further in communication with a computer via an electrochemical instrument.

17. The apparatus of claim 1, wherein the substrate is further in communication with the electrochemical instrument.

18. The apparatus of claim 17, wherein the electrochemical instrument is a potentiostat or a galvanostat.

19. The apparatus of claim 1, further comprising a plurality of microcavities.

20. The apparatus of claim 19, further comprising a plurality of electrically conducting and chemically inert substrates.

21. The apparatus of claim 1, wherein at least one electrical lead is in electrical contact with two or more substrates.

22. The apparatus of claim 21, wherein each substrate is in electrical contact with a first electrical lead, and the plurality of substrates is in contact with a common counter electrode.

23. A method comprising measuring an electrochemical property of a sample having a maximum volume of less than 15 mm$^3$ and including an electrochemically active material.

24. The method of claim 23, wherein the electrochemically active material comprises a cathode active material.

25. The method of claim 23, wherein the electrochemically active material comprises an anode active material.

26. The method of claim 23, wherein said measuring comprises contacting the sample with an apparatus comprising a first electrical lead and a second electrical lead.

27. The method of claim 26, further comprising forming a circuit with an anode.

28. The method of claim 26, further comprising forming a circuit with a cathode.

29. The method of claim 23, further comprising a plurality of samples.

30. The method of claim 29, wherein the electrochemical property of each sample is individually measured.

31. The method of claim 30, wherein the electrochemical property of each sample is measured concurrently.

32. The method of claim 30, wherein the electrochemical property of each sample is measured sequentially.

* * * * *

UNITED STATES PATENT AND TRADEMARK OFFICE
CERTIFICATE OF CORRECTION

PATENT NO. : 7,956,571 B2
APPLICATION NO. : 12/099426
DATED : June 7, 2011
INVENTOR(S) : In Tae Bae It is certified that error appears in the above-identified patent and that said Letters Patent is hereby corrected as shown below:

In column 10, line 63, delete "micro cavity" and insert --microcavity--.

Signed and Sealed this
Twenty-sixth Day of July, 2011

David J. Kappos
*Director of the United States Patent and Trademark Office*